US008698407B1

(12) United States Patent
Chen et al.

(10) Patent No.: US 8,698,407 B1
(45) Date of Patent: Apr. 15, 2014

(54) HIGHLY INTEGRATED NON-INDUCTIVE LED DRIVER

(75) Inventors: Timothy Chen, Aurora, OH (US); John Boyle, Garrettsville, OH (US)

(73) Assignee: Technical Consumer Products, Inc., Aurora, OH (US)

( * ) Notice: Subject to any disclaimer, the term of this patent is extended or adjusted under 35 U.S.C. 154(b) by 124 days.

(21) Appl. No.: 13/295,868

(22) Filed: Nov. 14, 2011

(51) Int. Cl.
*H05B 37/00* (2006.01)
*H05B 39/00* (2006.01)
*H05B 41/00* (2006.01)

(52) U.S. Cl.
USPC ........ 315/193; 315/185 R; 315/188; 315/294; 315/307

(58) Field of Classification Search
None
See application file for complete search history.

(56) References Cited

U.S. PATENT DOCUMENTS

| 4,580,080 | A | 4/1986 | Smith |
| 5,204,563 | A | 4/1993 | Jason |
| 6,037,722 | A | 3/2000 | Moisin |
| 7,550,934 | B1 | 6/2009 | Deng et al. |
| 7,830,094 | B2 | 11/2010 | He et al. |
| 7,839,095 | B2 | 11/2010 | Ballenger et al. |
| 8,040,071 | B2 * | 10/2011 | Lin et al. ...................... 315/224 |
| 8,237,373 | B2 | 8/2012 | Fukui |
| 8,378,568 | B2 | 2/2013 | Sohn et al. |
| 2011/0140622 | A1 * | 6/2011 | Suzuki ......................... 315/224 |
| 2011/0241557 | A1 * | 10/2011 | Grotkowski et al. ......... 315/246 |
| 2012/0068617 | A1 * | 3/2012 | Matsuda et al. .............. 315/240 |
| 2012/0104970 | A1 * | 5/2012 | Okubo et al. ................. 315/291 |

* cited by examiner

*Primary Examiner* — Anh Tran
(74) *Attorney, Agent, or Firm* — Thompson Hine L.L.P.

(57) ABSTRACT

An inductorless LED driver powers a string of low current LEDs. A phase controlled triac dimmer, serially connected to a full-wave rectifier circuit, performs as an LED current and triac holding current control element. The output of the full-wave rectifier circuit is divided into two circuit paths; the first path provides power to drive a string of serially-connected low-current LEDs, and the second path connects to a dynamic load, which supplies a holding current that flows through the triac dimmer. There are two feedback control systems; the first regulates the luminance of the LEDs; the second regulates the triac holding current to eliminate lamp flicker.

20 Claims, 6 Drawing Sheets

FIG. 6

HIGHLY INTEGRATED NON-INDUCTIVE LED DRIVER

FIELD OF INVENTION

The present invention relates to semiconductor lighting devices, and more particularly to low current Light Emitting Diode (LED) lighting systems as used in conventional AC dimming circuits; the electronic driver circuits are used to power and control the light output of the LEDs.

A lighting system utilizing serially connected low current LEDs that are operated by the driver circuit as disclosed herein, can achieve 0-100% flicker-free dimming and yet have compact size, high efficiency, high power factor, and still maintain a low cost.

BACKGROUND OF THE INVENTION

Semiconductor lighting systems that include the now familiar LED, are growing rapidly in popularity and success. Semiconductor lighting presents a number of advantages over more common lighting systems, such as incandescent and fluorescent lighting systems; they are more energy efficient than incandescent lamps, and they exhibit significantly greater lamp life than either incandescent or fluorescent lamps.

However, the current state of semiconductor lighting products shows that they nevertheless suffer from a number of disadvantages when compared to incandescent and fluorescent lighting systems, mainly when dimming the lamp. Employing LED lighting devices in conjunction with conventional AC dimming circuits has been addressed in a number of ways that are generally unsatisfactory in the marketplace due to the design of dimmers in existing installations.

The most commonly installed type of dimming circuit incorporates a 300 or 600-watt triac dimmer. These dimmers are designed to operate on lamp circuits with non-trivial resistive loads, such as an incandescent or halogen lamp, and consequently require a holding current in order to function. Triac dimmers remove some portion of the AC voltage waveform in order to dim lamps effectively. This is an efficient and satisfactory method to achieve dimming incandescent and halogen lamp circuits, where the thermal inertia of the filament maintains a steady illumination; but this is an unsatisfactory for LED lighting implementations.

The LEDs employed in LED lamp packages may be either high current or low current LEDs. LED lamp packages incorporating high current LEDs rely on a conventional converter circuit (such as a buck or flyback converter) to bring the line voltage down to the operating voltage of the LEDs. This approach is currently predominant in the art. Even in non-dimming applications, the converter circuitry requires several components including bulky inductive elements. Each component in turn adds to energy waste and reduced reliability through the circuit. Moreover, each additional component increases the size of the driver circuit, generally making it more difficult to fit existing incandescent fixtures, sockets, or form factors. The bulkiest of these components are the inductive elements needed as energy storage elements for high current LED drivers. The higher cost associated with the number of components required by high current LED drivers also contributes to a high cost that may result in a low market penetration for LED lamps.

Two significant issues occur when such converter circuitry is placed in a triac-dimmed circuit.

First, the conventional converter circuitry draws no current at all at some portions of power line cycle, a situation incompatible with the triac dimmer requirement for a holding current. This generally results in unacceptable lamp pulsing and flickering that is likely to annoy the end user.

Secondly, the conventional converter circuitry may draw high peak current with having a high total harmonic distortion (THD) and low power factor that inordinately limit number of LED lamps can be connected to the dimmer.

In short, conventional converter circuitry is not acceptable for dimming applications of LEDs. In order to obtain satisfactory dimming performance in high current LED lighting systems, even more components are required. These solutions exacerbate rather than alleviate the problems of efficiency, cost, size, and reliability.

This poor performance of high current LEDs in dimming applications has led leading manufacturers of energy efficient lighting products to turn to low current LEDs for its dimming applications. Low current LEDs avoid many of the problems of high power LEDs in a dimming circuit. Current dimmable low current LED lamps incorporate low current LEDs in one or more series circuits and a driver circuit that allows the lamps to operate on standard line power. These driver circuits are generally comprised of a bridge rectifier and a capacitor to smooth the rectifier output. However, the inclusion of the capacitor may cause the lamp to draw too little current to maintain a holding current from an industry standard triac dimmer, initially extinguishing the lamp and then causing an unacceptable flicker similar to that found in a high current LED lamp on a dimmed conventional converter circuit. For low current LEDs, commonly, the lamp cycles rapidly from illumination to extinguishments, as the capacitor in the driver circuit charges sufficiently to sustain LED illumination, removes the holding current from the triac subsequently discharges, begins to draw again on the triac, and re-illuminates the LED at full power. These voltage spikes cause drastic flickering that is unacceptable in general lighting applications.

Flickering in low current LED lamp packages is currently overcome by the addition of a load resistor to the driver circuit before the bridge rectifier to dissipate sufficient power to maintain a holding current. However, the inclusion of the resistor may reduce the efficiency of the lamp by 50% or more, depending on the output of the lamp. Adding a load resistor across the line is an improvement, but remains an unsatisfactory solution.

The following prior art discloses the various aspects in the design of an LED driver using MOSFETs as the primary source to energize the LEDs.

U.S. Pat. No. 5,204,563, granted Apr. 20, 1993, to B. L. Jason, discloses a MOSFET output driver circuit that is protected from overstress caused by commutating currents. The MOSFETs are protected by employing a gate control circuit and a small inductor in series with the sources of the MOSFETs. The circuit limits the rate of change of current that reverse biases a MOSFET's drain-source diode. The circuit is applicable to totem-pole and bridge configurations.

U.S. Pat. No. 7,550,934, granted Jun. 23, 2009, to Q. Deng, et al., discloses an LED driver that drives one or more strings of series-connected LEDs. A feedback voltage at a sense resistor is detected by an op amp, and the op amp controls the conductivity of a MOSFET in series with the LEDs to regulate the peak current. The MOSFET is also controlled by a PWM brightness control signal to turn the LEDs on and off at the PWM duty cycle. A boost regulator provides an output voltage to the string of LEDs. A divided voltage at the end of the string of LEDs is regulated by the boost controller to keep the divided voltage constant. When an LED becomes an open circuit, the boost regulator controller is immediately decoupled from the regulator's switching transistor. If an LED shorts, the boost regulator reduces its output voltage, and the duty cycle of the brightness control signal is automatically increased.

U.S. Pat. No. 7,830,094, granted Nov. 9, 2010, to X.Y. He, et al., discloses a driver arrangement for LED light sources that includes a transformer having primary and secondary winding connections. A first electronic switch (SW1) controls current flow through the primary winding, and a sensing resistor is coupled to the primary winding to produce a current sensing signal. A second electronic switch (SW2) is sensitive to the sensing signal to switch off SW1 as current flow through the primary winding reaches a given threshold. SW1 is thus alternatively turned-on and off in alternating turn-on and switch-off phases to power the LED light source via the secondary winding. SW1 is a field effect transistor, preferably a MOSFET. The transformer is SELV-rated. The sensing resistor may be a variable resistor to adjust the duration of the on/off phases to permit controlled dimming.

The following prior art discloses the various aspects in the design of an LED driver using a triac semiconductor as a voltage dropping element.

U.S. Pat. No. 4,580,080, granted Apr. 1, 1986, to A. M. Smith, discloses a phase control ballast in which a reactor and a triac are connected in series with a high intensity discharge (hid) lamp across an ac voltage source. A supra-linear converter connected to a rectifier-filter provides a reference voltage which is a supra-linear function of the source voltage. A ramp generator provides a ramp voltage climbing at a constant rate. At the instant when the ramp voltage exceeds the level of the reference voltage, a comparator circuit provides a signal to the gate of the triac which turns it on. A triac state detector responds to the turning on of the triac in either polarity by dropping the ramp voltage to zero and holding it at zero until the triac turns itself off.

It is therefore an object of the present invention to provide a dimmable lighting system utilizing serially connected low current LEDs.

It is another object of the present invention to provide a dimmable lighting system that does not utilize inductive components which in turn adds to energy waste and decreased circuit reliability and increased product size.

It is another object of the present invention to provide a dimmable semiconductor lamp driver providing a dynamic holding current to flow through the triac dimming circuit It is still another object of the present invention to provide a dimmable semiconductor lamp driver providing flicker-free dimming.

It is still yet another object of the present invention to provide a dimmable semiconductor lamp driver providing flicker-free dimming, while attaining a 0-100% dimming range.

Another object of the present invention is to provide a dimmable semiconductor lamp driver with improved thermal protection.

An additional object of the present invention is to provide two closed loop negative feedback control systems to regulate the luminescent output of the LED array and to control the holding current flowing through the triac dimming circuit.

It is a final object of the present invention to provide a dimmable semiconductor lamp driver with having increased energy and manufacturing efficiencies.

The preceding and other objects, features, aspects and advantages of the present invention will become better understood from a careful reading of the detailed description provided herein with appropriate reference to the accompanying drawings.

SUMMARY OF THE INVENTION

The present invention has been designed to solve the preceding problems known to the prior art.

Therefore, a first aspect of the present invention is to provide a non-inductive dimmable semiconductor lamp driver, a driver having increased energy and manufacturing efficiency and reduced product size. Dimmable semiconductor lighting presents several advantages over the more common lighting systems, such as incandescent and fluorescent lighting systems; they are more energy efficient than incandescent lamps, and they exhibit significantly greater lamp life than either incandescent or fluorescent lamps.

Another aspect of the present invention is to provide a non-inductive lamp. The entire circuit disclosed below has an unintended inductance typically of one microhenry or less. Any presence of inductance in the contemplated circuit is due to parasitic presence of inductance in non-ideal components.

A further aspect of the present invention is to provide flicker-free and pulse-free dimming in a non-inductive semiconductor lamp driver. A reduction in the amount of undesirable flickering is provided by supplying a sufficient holding current, only as necessary, to the triac dimming circuit. When driver operating current is determined to be insufficient to provide a holding current, the driver dynamically draws supplemental holding current to make up the shortfall.

A final aspect of the present invention is to provide a non-inductive dimmable semiconductor lamp driver with improved thermal protection, including electronics components and LED chip.

To attain these objectives, the present invention is comprised of a triac dimming circuit serially connected to a full wave diode bridge, where the phase controlled triac dimming circuit performs as an efficient voltage dropping element.

The output of the full wave bridge rectifier is split into two circuit paths; the first path provides power to drive a string of serially-connected low current LEDs, and the second path connects to a dynamic load, which supplies a holding current that is reflected back, to supplement the current passing through the triac dimmer.

Each of the two circuit paths is comprised of a feedback control system; the first control system provides a luminance control of the string of serially-connected low current LEDs, and the second control system provides a dynamic load across the output of the full wave diode bridge.

Summarizing, the first closed loop feedback control system provides the control of the luminance of the LEDs over a range of zero to 100 percent; and the second closed loop feedback control system provides the control of a dynamic load across the output of the full wave diode bridge to effect a holding current through the triac dimmer to eliminate flickering.

DETAILED DESCRIPTION OF THE INVENTION

Figure 1:
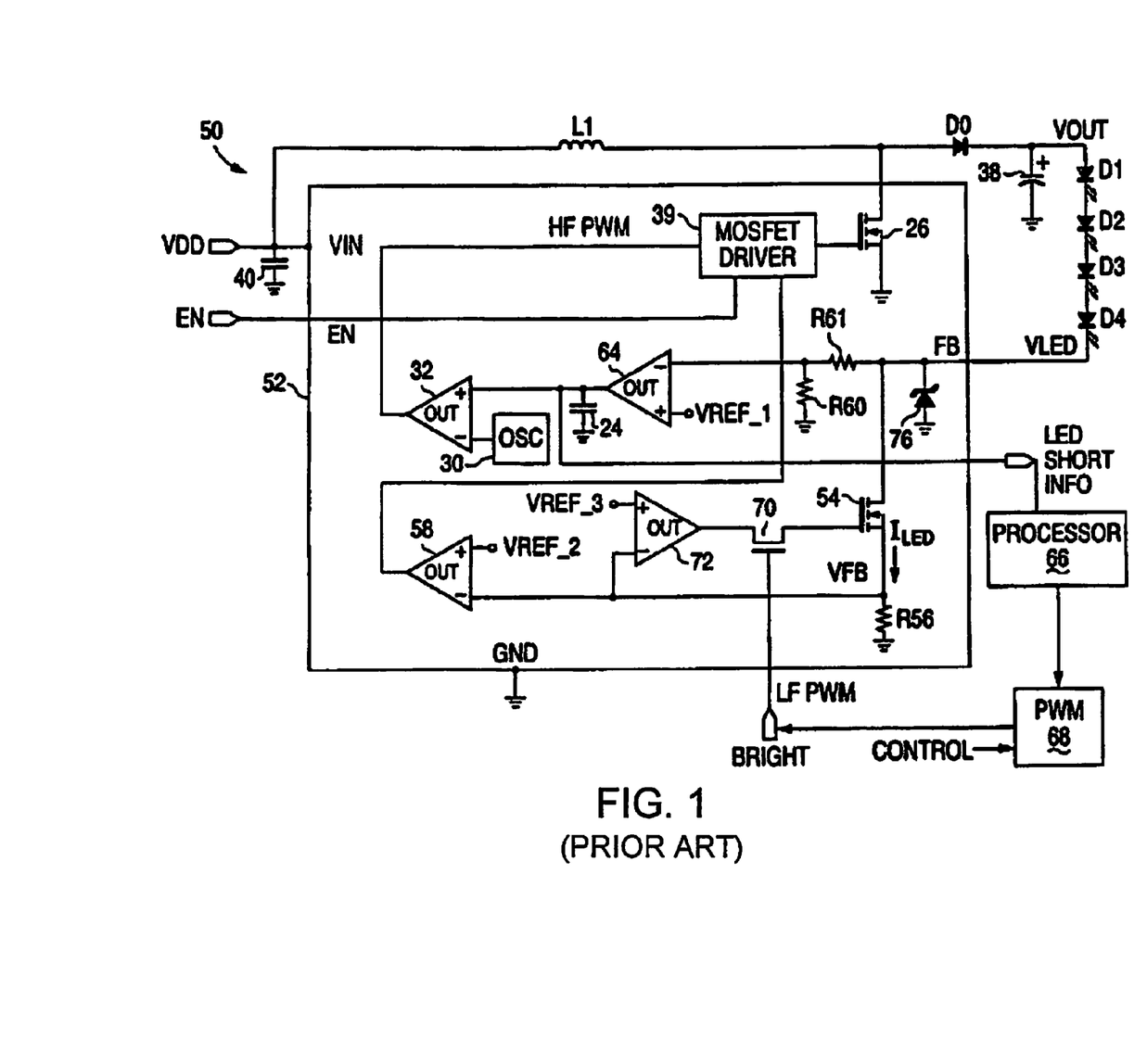
FIG. 1 is a schematic diagram that illustrates a prior art LED driver utilizing an inductive component needed as an energy storage element for high current LED drivers
Figure 2:
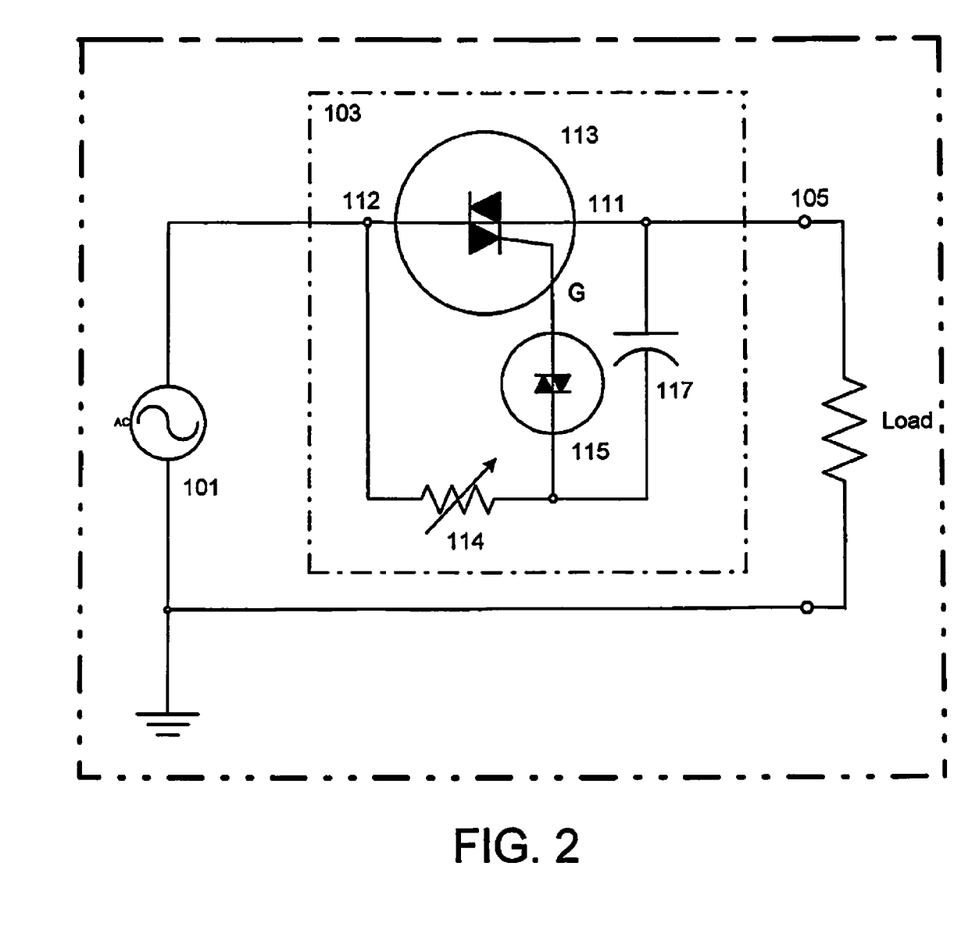
FIG. 2 is a schematic diagram showing the basic triac dimming circuit in accordance with a first embodiment of the present invention.

Referring now to the drawings in detail, FIG. 2 is a schematic diagram showing the basic triac dimming circuit in accordance with a first embodiment of the present invention.

The object of the phase controlled triac is to provide an inexpensive phase controlled circuit that will attain stable operation, accompanied by exceptional regulation against line and load variations, and to provide a precise open loop feedback control circuit. The principal features are shown in more detail in FIG. 5.

Figure 3:
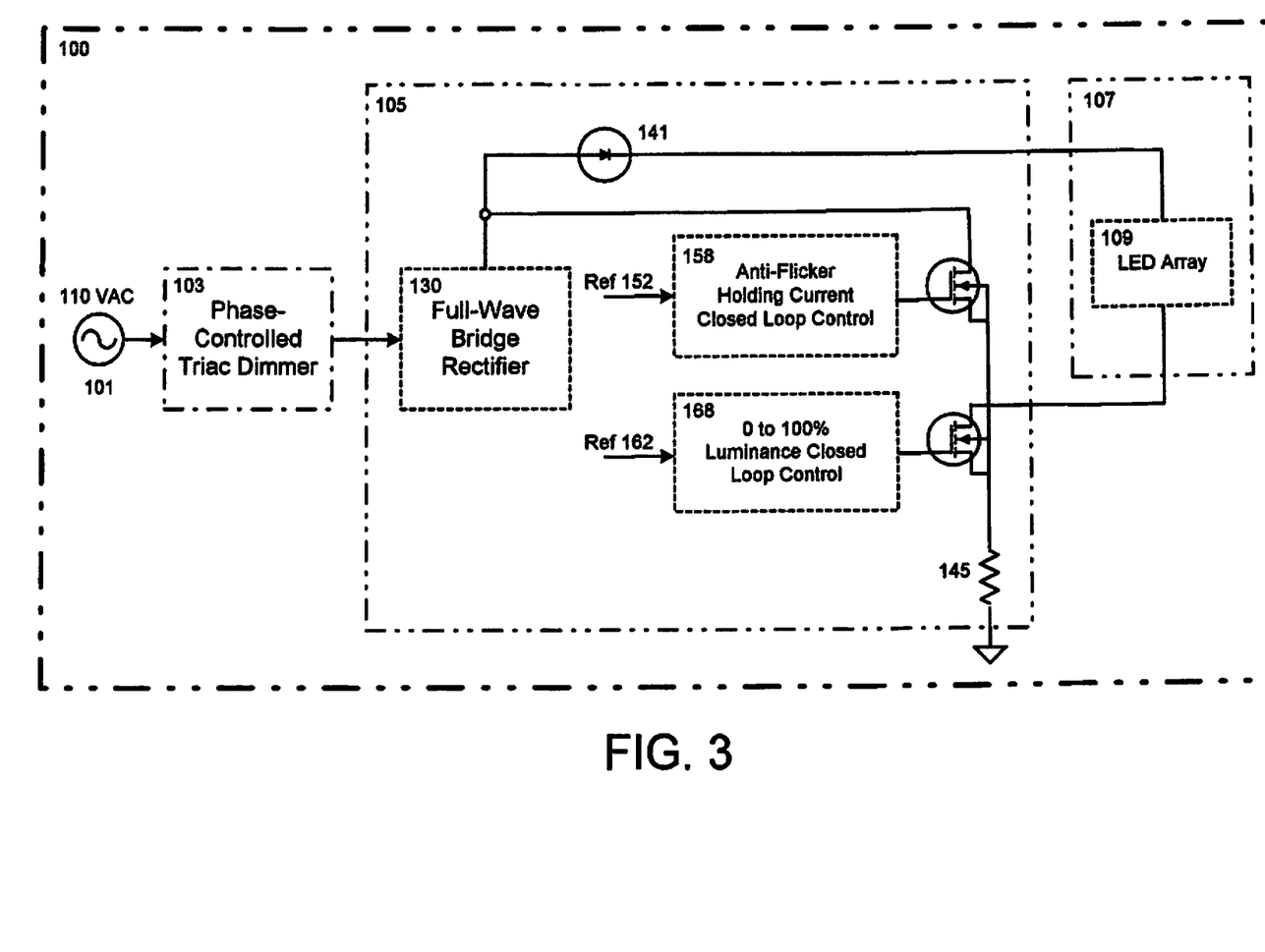
FIG. 3 is a block diagram of the presently preferred embodiment of the dimmable low current Light Emitting Diode lighting system that incorporates two closed loop control functions.

FIG. 3, a block diagram, shows the highly integrated non-inductive LED driver 100 utilizing serially connected low current LEDs that are operated by the driver circuit; the plurality of LEDs can attain 0-100% flicker-free, dimming and yet have compact size, high efficiency, high power factor, and still yet maintain a low cost.

Also shown in FIG. 3, are two closed loop feedback control systems; the first control system provides the basic luminance control system that is capable of attaining 0 to 100% dimming, and the second control system that provides a controlled holding current applied to the triac dimming circuit to achieve flicker-free operation.

Figure 4:
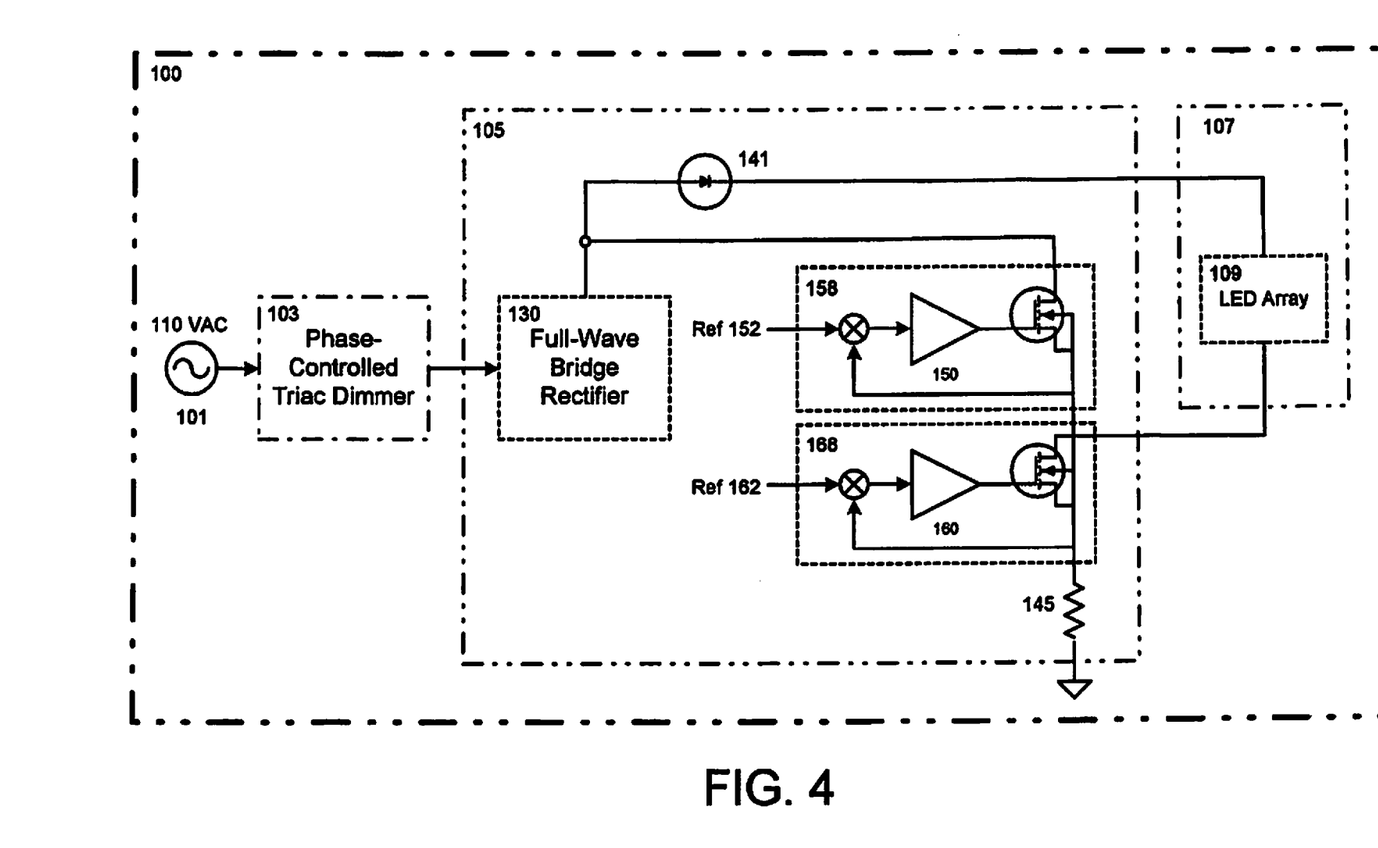
FIG. 4 is a block diagram, partially in schematic, of the presently preferred embodiment of the dimmable low current Light Emitting Diode lighting system, that incorporates two closed loop control functions, i.e. an anti-flicker closed loop system to control the holding current and a luminance closed loop control system.

FIG. 4, is a more detailed block diagram, a block diagram, partially in schematic, of the presently preferred embodiment of the dimmable low current Light Emitting Diode lighting system 100, that incorporates two closed loop negative feedback control functions, i.e. an anti-flicker closed loop system to control the holding current and a luminance closed loop control system.

In the luminance closed loop control system 168, a feedback voltage appearing across sense resistor 145 is detected by amplifier 160, which when compared to a reference signal 162; outputs a controlled variable that controls the conductivity of a second MOSFET, where the drain of the MOSFET is connected to the LED array to regulate the output luminescence.

With reference to the holding current closed loop control system 158, error amplifier 150, which when comparing the voltage across the sensing resistor 145 to reference signal 152, it controls the conductivity of a first MOSFET that is connected across the output of the full wave bridge rectifier, to provide a regulated holding current through the triac dimming circuit 103, thereby eliminating undesirable flickering.

Figure 5:
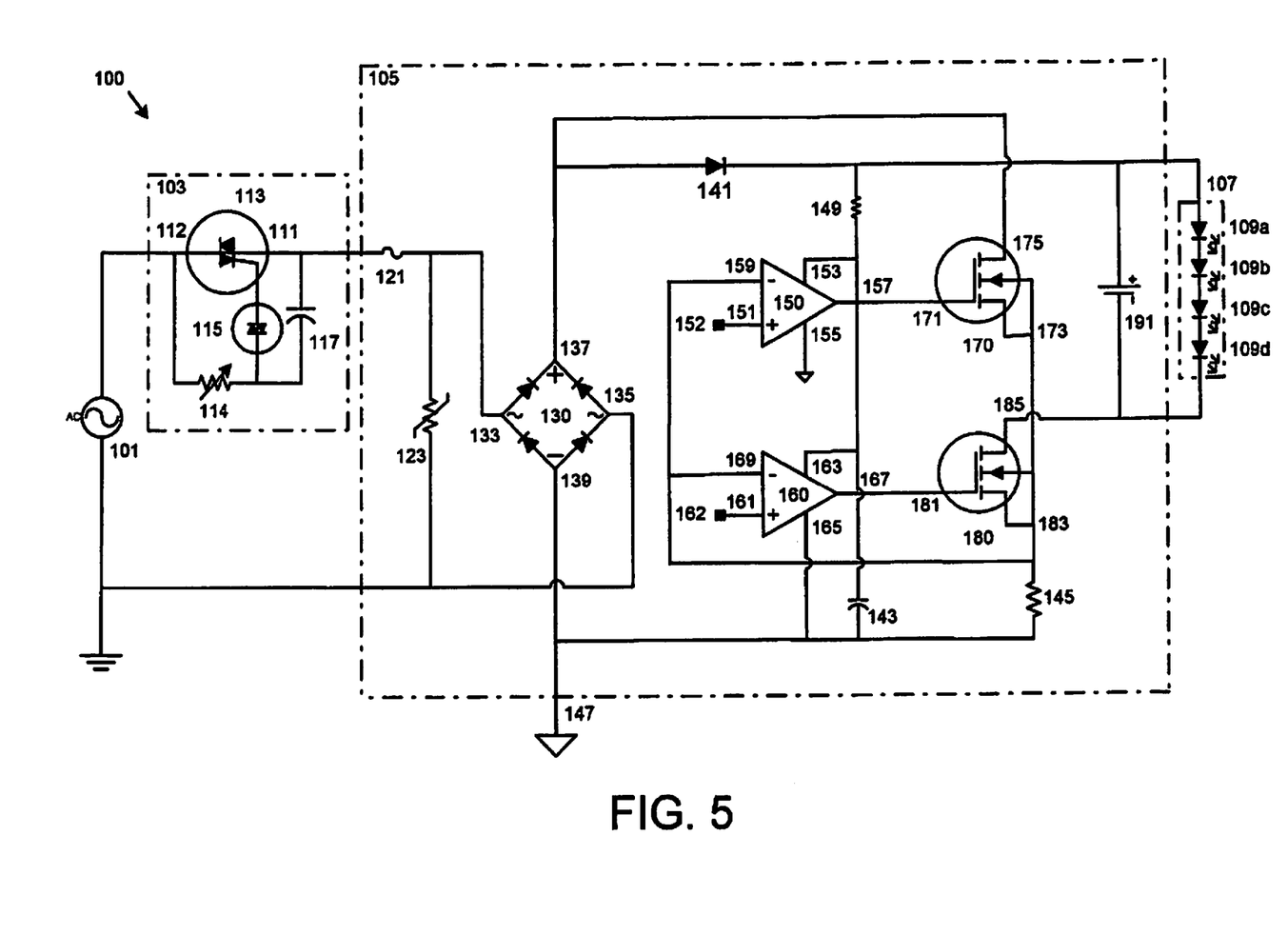
FIG. 5 is a schematic diagram showing the preferred embodiment of the present invention, having a plurality of serially connected low current LED lamps, as operatively installed in the preferred embodiment of the dimmable semiconductor lamp driver in accordance with embodiments of the present invention.

Turning now to FIG. 5, a schematic diagram that shows the preferred embodiment of a LED lamp driver 100, as operatively incorporated with having a basic triac dimming circuit in accordance with a first embodiment. The LED lamp driver provides power to the LED array 107 of low current serially connected LEDs, 109a, 109b, 109c, and 109d.

As shown, an alternating current power source 101 is connected in series through an exemplary triac dimming circuit 103. In the dimming circuit 103, AC power source 101 is connected to a second main terminal 112 (MT2) of triac 113. Variable resistor 114, is connected to the second main terminal 112 (MT2) of triac 113, and the opposite end of variable resistor 114 is connected to capacitor 117, which is connected to a first main terminal 111 (MT1) of triac 113 form a divider that is connected to a first main terminal of diac 115, whose second main terminal is connected to the gate G (not shown) of triac 113. The first main terminal 111 (MT1) of triac 113 is connected to the input of the driver circuit 105.

First main terminal (MT1) of triac 111 is connected into driver circuit 105 to fuse 121. Varistor 123 and diode bridge rectifier 130 are connected in parallel from fuse 121 to the AC power source 101, via Triac Dimmer 103. Fuse 121 connects to alternating current terminal 133 of diode bridge rectifier 130, and diode bridge rectifier connects from alternating current terminal 135 to the common ground terminal of AC power source 101.

Cathode 137 of diode bridge 130 is connected to both the anode of reverse blocking diode 141 and drain 175 of switching device 170. The cathode of reverse blocking diode 141 is connected to the positive terminal of electrolytic capacitor 191 and the low current serially connected LED array 107, comprising LED 109a, 109b, 109c, and 109d. Consequent to the use of low current LEDs 109a-d, only minimal inductance is introduced in the LED driver 105; that inductance being parasitic and due to non-ideal behavior of components. Such inductance is generally in the low microhenry range. The negative terminal of electrolytic capacitor 191 and the cathode terminal of the low current serially connected LED array 107 are connected to the drain 185 of switching device 180. Resistor 149 and capacitor 143 comprise a low pass filter to supply a smoothed DC power to the terminal 153 of the first error amplifier 150, and to the terminal 163 of the second error amplifier 160. Ground references 155, 165 of error amplifiers 150 and 160, energy storage capacitor 143, the anode 139 of diode bridge rectifier 130, current sensing resistor 145, are connected to circuit ground 147.

The source 173 of switching device 170 is connected to the source 183 of switching device 180, which in turn are connected to the non-inverting input of error amplifier 150 and to the inverting input of error amplifier 160. Reference voltage 173, which is derived from external components (not shown), is connected to the inverting input 151 of error amplifiers 150, and reference voltage 183, which is also derived from other additional external components (not shown), is connected to the non-inverting input 161 of error amplifier 160. The output 157 of error amplifier 150 is connected to the gate 171 of switching device 170, and the output 167 of error amplifier 160 is connected to the gate 181 of switching device 180.

Figure 6:
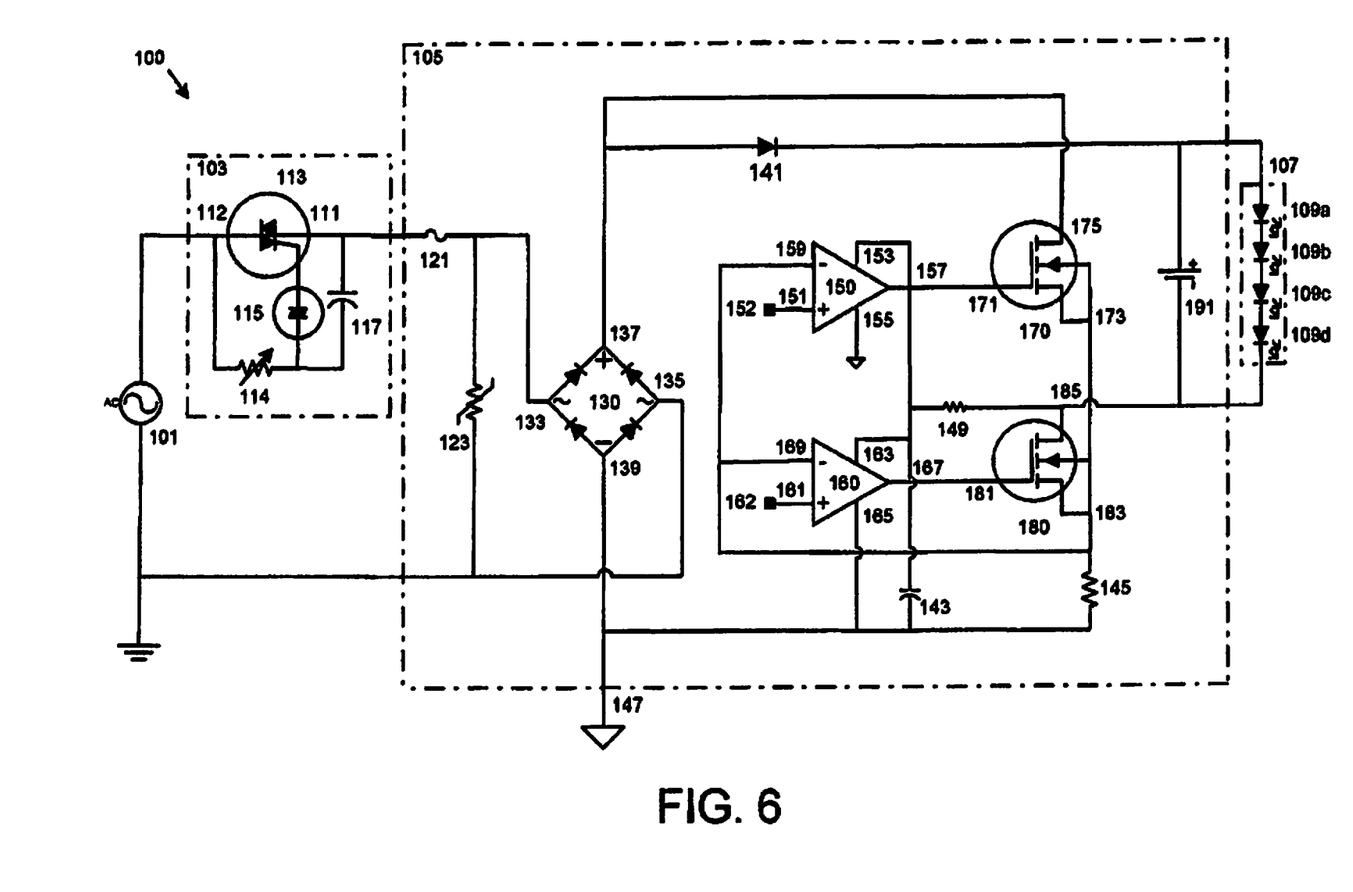
FIG. 6 is a schematic diagram showing an alternative embodiment of the present invention, wherein the current sensing resistor is connected to the drain of the second MOSFET switch.

By reference to FIG. 6, there is shown an alternative embodiment of the invention wherein an alternative source of DC supply for the two error amplifiers or comparators proceeds through sensing resistor 149.

Principles of Operation

In typical operation, the AC current waveform supplied by AC power source 101, is modified by the triac dimmer 103 before being applied to the LED driver circuit 105. The AC current waveform is modified so that only part of each half cycle of the AC waveform is applied to the load. This "chopping" of the waveform allows the amount of power supplied to the load to be determined by the phase angle of the AC waveform. The two common forms of chopping the AC waveform are leading edge and trailing edge chopping.

Leading edge chopping is accomplished by triacs or other thyristor dimming circuits, and they remove the leading edge of each half-cycle of current, and allow the current to continue to flow until the current falls again to zero (0), i.e. (the zero crossing point).

In trailing edge chopping, the turn off for each half-cycle is delayed from the zero crossing point and interrupts the flow of current such that the trailing edge of AC waveform is removed.

Because triac dimmers, (including leading edge chopping devices), are most common in existing installations, embodiments are discussed with reference to triac dimmers. Nevertheless, embodiments of the invention are equally suitable for use in trailing edge dimming installations.

Within the driver circuit, all AC power is channeled through fuse 121. Fuse 121 is designed to blow (to melt when overloaded) when current through the device significantly exceeds the normal operating current-draw of the lamp circuit. Although the term "fuse" is used to describe fuse 121, other circuit breaking devices may be used alternatively, including but not limited to discrete fuses, PCB fuse traces, and thermal or thermal-magnetic circuit breakers.

Varistor 123, also known as a voltage dependent resistor, is incorporated to provide protection against excessive transient voltages, i.e. surge protection. When the voltage from AC supply 101 is excessive, varistor 123 diverts current away from the more sensitive components in the driver circuit 105. The most common type of varistor, the metal oxide varistor, is suitable for use as varistor 123, but other transient suppression components have been considered, including avalanche diodes and spark gaps.

Full wave diode bridge rectifier 130 converts alternating current supplied through triac dimmer 103 to a pulsed direct current (DC) voltage. When an alternating current is supplied to the AC input terminals 133 and 135 of the full wave diode bridge rectifier 130, the operation of the bridge rectifier 130 converts both polarities of the input waveform to half-sine pulses comprising positive and negative polarities (DC), available at positive 137 and negative 139 terminals, respectively.

It may be desirable in other arrangements to employ a plurality of LED arrays 107. However, each LED array would require its own driver circuit 105. But, on the other hand, in an alternative embodiment, certain portions of the driver circuit 105, particularly fuse 121, varistor 123, and rectifier 130 may each serve a plurality of driver circuits (not shown).

As shown in FIG. 5, the half-sine pulsed DC voltage supplied by bridge rectifier 130 is split into two circuit paths. The first circuit path through reverse blocking diode 141, provides a DC voltage to electrolytic capacitor 191 and LED array 107, which are connected in parallel. Electrolytic capacitor 191 discharges energy when diode 141 is reverse blocking, i.e., when charge of electrolytic capacitor 191 is greater than DC voltage supplied from bridge rectifier 130, and supplies energy to the LED array 107, causing the plurality of LEDs 109 to illuminate. When diode 141 is not reverse blocking, energy is supplied directly to the LED array 107 and electrolytic capacitor 191 through diode 141, simultaneously charging electrolytic capacitor 191 and causing the plurality of LEDs 109 in LED array 107 to illuminate. The second circuit path is connected to the drain 173 of MOSFET 170.

The Closed-Loop Negative-Feedback Control of Luminance

The current through electrolytic capacitor 191 and the LED array 107 is controlled by a first reference voltage 162 applied to the non-inverting input 161 of error amplifier 160. The combination of second error amplifier 160 and second switching device 180, in a closed-loop negative feedback system arrangement, forces the current through second switching device 180, electrolytic capacitor 191, and the plurality of LEDs 109 in LED array 107 to conform to first reference voltage provided to the non-inverting input 161. The impedance of MOSFET switch 180, as it appears across source 183 and drain 185, continuously varies. In most embodiments, this impedance generally varies linearly in a MOSFET, although other impedance curves, including those of binary switching devices, may be used alternatively.

Current through second switching device 180 is monitored as being equivalent to the voltage that appears across the current sensing resistor 145. The voltage that appears across the current sensing resistor 145 varies proportionally with impedance of second switching device 180. This voltage appearing across the current sensing resistor 145 is applied to the inverting input 169 of error amplifier 160.

The difference between the voltage applied to the inverting input 169 and the reference voltage applied to the non-inverting input 161 is amplified by the second error amplifier 160. The amplified difference signal from the output 167 of error amplifier 160 to the gate 181 of the second switching device 180, increasing or decreasing the impedance of switching device 180.

The negative feedback control regulates the lumen output of the plurality of LEDs 109 in the LED array 107 and regulates the charge on electrolytic capacitor 191.

The Closed-Loop Negative-Feedback Control of the Holding Current

When no current is drawn because the reverse blocking diode 141 is in the reverse blocking mode of operation, no current flows through the triac dimmer 103. Without the presence of a "holding current," triac 113 will function abnormally, causing a visually disturbing flicker. The second circuit path draws a direct current, only as necessary, to provide a sufficient holding current through triac 103, thereby preventing the plurality of LEDs lamps 109 in the array 107, to flicker.

The voltage appearing across the current sensing resistor 145 is also applied to the inverting input 159 of first error amplifier 150. This signal, at the inverting input 159 of first error amplifier 150 is compared to the reference voltage 152 that is applied to the non-inverting input 151 of first error amplifier 150; the difference between these signals appears at the output 157 of error amplifier 150 and is applied to the gate 171 of first switching device 170, increasing or decreasing the impedance of switching device 170 in a direct relationship. The voltage appearing at the non-inverting input 151 of first error amplifier 150 corresponds to the minimum holding current that is needed to prevent flickering.

This driver circuit disclosed below has a parasitic inductance in the low microhenry range typically less than one microhenry. No component of the LED driver is designed to be inductive. When diode 141 is reverse biased or in the blocking mode of operation, the first circuit path draws no current, and the current flow through resistor 145 is reduced. The difference between the reduced voltage signal found at resistor 145 and the minimum holding current reference voltage is amplified by first error amplifier 150. Hence, the impedance of first switching device 170 is increased or decreased. First switching device 170 operates to dispel excess current and to provide a sufficient holding current to maintain normal operation of the triac dimming circuit 103.

Both error amplifiers 150 and 160, as well as capacitor 143 draw their power from the first circuit path through resistor 149 when diode 141 is not reverse blocking. When diode 141 is reverse blocking, error amplifiers 150 and 160 draw power from the discharge of capacitor 143 and capacitor 191.

It should be understood that although the present invention is described in detail, there may be other modifications and variations that will become apparent to those who are skilled in the art upon reading this specification, and that these modifications or variations that can be made should not detract from the true spirit of this invention.

What is claimed is:

1. A lamp driver for light emitting diodes (LEDs), comprising an LED driver circuit having a full wave diode bridge rectifier with an output that splits into at least two paths including a first path that connects to a dynamic load across an output of the full waive diode bridge rectifier creating a holding current for stable operation of the LED driver circuit; and a second path that connects to a string of LEDs and comprises a luminance closed loop control for zero to one hundred percent luminance of the LEDs; wherein no component of the LED driver is designed to be inductive.

2. A lamp driver for LEDs as defined in claim 1, the first path further comprising an anti-flicker holding current closed loop control.

3. A lamp driver for LEDs as defined in claim 2, wherein the second path connects via a reverse blocking diode to the string of LEDs and to an electrolytic capacitor, wherein the electrolytic capacitor is connected in parallel with the string of LEDs, said capacitor holding a charge to be drawn by the LEDs.

4. A lamp driver for LEDs as defined in claim 3, wherein the string of LEDs comprises a plurality of serially-connected low current LEDs.

5. A lamp driver for LEDs as defined in claim 4, wherein the first path includes a first switching device that is connected across the output of the full wave bridge rectifier and further connected to an error amplifier.

6. A lamp driver for LEDs as defined in claim 5, the anti-flicker holding current closed loop control comprising the error amplifier with inputs from a sensing resistor and a reference signal that are compared, and a difference in the inputs is amplified and output to a gate of the first switching device to regulate the holding current by controlling the first switching device.

7. A lamp driver for LEDs as defined in claim 6, wherein the string of LEDs is connected to a drain of a second switching device.

8. A lamp driver for LEDs as defined in claim 7, the luminance closed loop control comprising a second error amplifier with inputs from the sensing resistor and a reference signal, wherein a different in the inputs is compared, amplified and output to the gate of the second switching device.

9. A lamp driver for LEDs as defined in claim 8, wherein due to a closed loop arrangement, current through the second switching device, the electrolytic capacitor and the string of LEDs is forced to conform to the reference signal input to the second error amplifier.

10. A lamp driver for LEDs as defined in claim 9, wherein the LED driver is energized via a triac dimmer that modifies an AC power source before being applied to the LED driver circuit.

11. A lamp driver for LEDs as defined in claim 10, wherein holding current supplied via the first path is reflected back to supplement current passing through the triac dimmer.

12. A lamp driver for LEDs as defined in claim 11, wherein the first switching device dispels excess current and provides a sufficient holding current to maintain operation of the triac dimming circuit.

13. A lamp driver for LEDs as defined in claim 12, wherein the anti-flicker holding current closed loop control eliminates flickering.

14. A lamp driver for LEDs as defined in claim 13, wherein the second path provides a varied impedance to regulate an LED current, obviating the need for inductive components.

15. A lamp driver for LEDs as recited in claim 14, wherein the string of LEDs is energized by the electrolytic capacitor when the diode is reverse blocking; the string of LEDs is energized directly from the full wave bridge rectifier when said diode is not reverse blocking.

16. A lamp driver for LEDs as recited in claim 15, wherein both the zero to one hundred percent luminance closed loop control and the anti-flicker holding current closed loop control draw power from the power source.

17. A lamp driver for LEDs as recited in claim 15, wherein both the zero to one hundred percent luminance closed loop control and the anti-flicker holding current closed loop control draw a signal through a current sensing resistor that is connected to a source of the switching device in the luminance closed loop control.

18. A semiconductor dimmable lamp driver for LEDs, suitable for use within a triac dimming circuit, comprising:
an LED driver circuit that includes a full wave bridge rectifier which connects to a first path that supplies a dynamic holding current which flows through a switching device that varies impedance and controls the holding current through the triac dimming circuit;
and the full wave bridge rectifier connects to a second path which includes a plurality of serially connected low current LEDs and a negative feedback closed loop control that regulates a luminance output of the LEDs;
wherein the LED driver circuit provides flicker-free dimming over a −100% dimming range;
wherein the dimmable lamp driver for LEDs has no inductive components, which insures energy conservation and increased circuit reliability.

19. A non-inductive dimmable lamp driver for LEDs, comprising a full wave bridge rectifier with a DC output that is split into two circuit paths including a first circuit path connected across a rectifier output producing a dynamic load with a consequent holding current for an uninterrupted energy supply; the first path including a closed loop holding current control;
a second circuit path connected to illuminate a plurality of low current LEDs, the second circuit path including a closed loop luminance control; both controls having a comparator wherein each control essentially conforms to a charge difference input to a respective comparator and outputted to a respective switch, wherein the holding current and luminance of the LEDs is regulated to ensure a sufficient holding current and continuous illumination of the low current LEDs.

20. An LED driver suitable for use within a triac dimming circuit, comprising:
a rectifier circuit;
at least one capacitor; and
a variable impedance closed loop negative control which controls charging current to at least one LED and additionally controls charging current to the at least one capacitor;

wherein no component of the LED driver is designed to be inductive.

\* \* \* \* \*

UNITED STATES PATENT AND TRADEMARK OFFICE
CERTIFICATE OF CORRECTION

PATENT NO. : 8,698,407 B1
APPLICATION NO. : 13/295868
DATED : April 15, 2014
INVENTOR(S) : Timothy Chen and John Boyle Page 1 of 1

It is certified that error appears in the above-identified patent and that said Letters Patent is hereby corrected as shown below:

In the Claims

In Claim 8, Column 9, Line 54 reads:

"wherein a different in the inputs is compared, amplified and"

it should read:

-- wherein a difference in the inputs is compared, amplified and --

Signed and Sealed this
Fifteenth Day of July, 2014

Michelle K. Lee
*Deputy Director of the United States Patent and Trademark Office*